Nov. 24, 1925.                              1,563,186
L. G. HALLER
COUPLING FOR PIPE RAILINGS
Filed Feb. 15, 1924
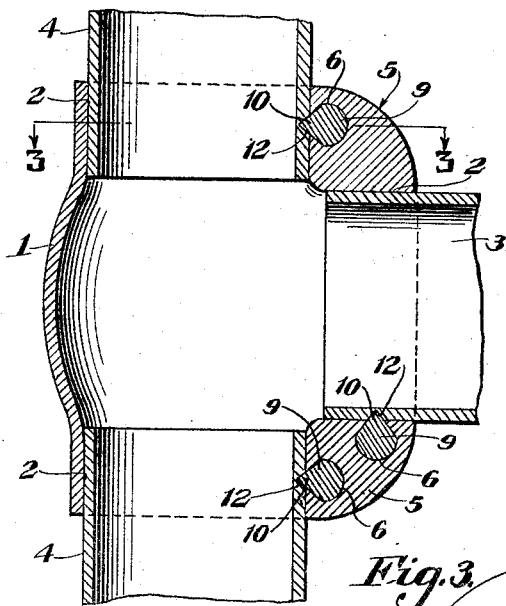
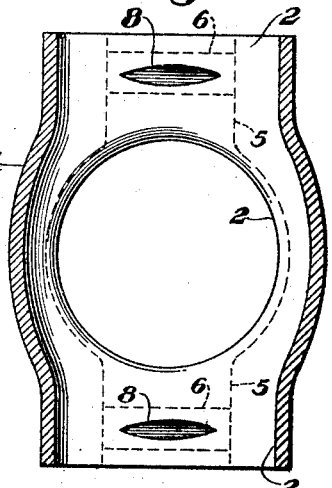
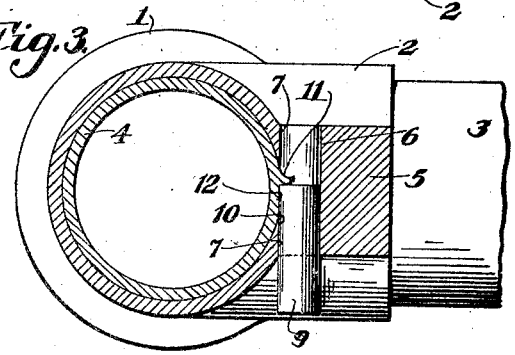
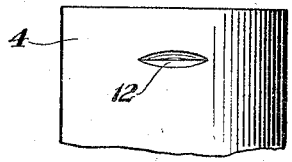
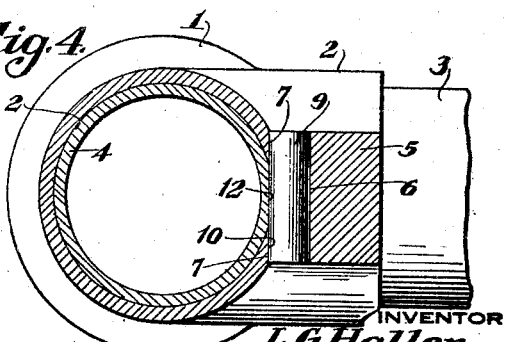
WITNESSES
INVENTOR
L. G. Haller
BY
ATTORNEY Patented Nov. 24, 1925.

1,563,186

UNITED STATES PATENT OFFICE.

LOUIS G. HALLER, OF CHATTANOOGA, TENNESSEE.

COUPLING FOR PIPE RAILINGS.

Application filed February 15, 1924. Serial No. 693,137.

*To all whom it may concern:*

Be it known that I, LOUIS G. HALLER, a citizen of the United States, residing at Chattanooga, in the county of Hamilton and State of Tennessee, have invented a new and useful Coupling for Pipe Railings, of which the following is a specification.

This invention relates to couplings for pipe railings.

The object is to provide coupling means for connecting the tubular rails to the tubular posts of this class of railings and to provide a positive locking together of the parts that will prevent accidental separation of the same under the severest strains to which such railings are subjected.

Another object is to provide locking means, which, when driven into position for holding the parts together, will form a seat for itself in the tubular post or in the tubular railing, either near the ends or intermediately of the same, thus positively avoiding any lost motion or movement of the parts, as when such seats are previously formed.

A further object is to provide locking means for such couplings which, when fully driven into position, are completely hidden from view and offer no projections to catch on the clothes or injure the hands.

A full and complete understanding of the invention may be obtained from a consideration of the following detailed description, taken in connection with the accompanying drawing forming a part of this specification; it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures;

Figure 1 is a vertical sectional view through a coupling for connecting the end of an intermediate rail to an end post of a tubular railing.

Figure 2 is a vertical section through the sleeve or socket of the coupling, the railing pipes being omitted.

Figure 3 is a horizontal sectional view through the device taken on the line 3—3 of Figure 1, and showing the locking pin being driven into position.

Figure 4 is a similar view, the locking pin being shown in locked position.

Figure 5 is a detail elevation of a portion of one of the railing pipes and showing the seat formed therein by the locking pin.

Figure 6 is a detail perspective view of the locking pin.

In the drawing there is illustrated a tubular sleeve 1 which preferably, for ornamental purposes, has its central portion formed into globe shape, though this is not necessary, as the sides may be straight or parallel, as will be readily seen.

The sleeve 1 is formed of suitable cast metal, and in the particular showing in the drawing consists of what is known as a T-coupling having three sockets 2 formed therein, though this is only one of many forms of couplings in which the invention may be used, as it may be applied to T's, elbows, crosses, Y-shaped couplings or floor flanges, or in any other similar place where it is desired to secure a tube or rod rail or bar into a sleeve or socket.

The coupling shown would properly be used for securing the end of an intermediate rail 3 to an upright post 4 such as would occur at the end of a fence or railing or at a gate, the rail 3 and the post 4 consisting of metal tubing, and the latter being shown as comprising two sections though the same may be continued on through the sleeve 1 as one continuous piece, in certain cases.

The sleeve 1 is provided at one side between the vertical alined sockets and the horizontal socket 2 with webs 5 formed integrally therewith and preferably quadrant-shaped in side view, the said webs being centrally located and considerably narrower than the diameters of the sockets.

Transverse bores or passageways 6 are formed through the webs 5 adjacent to the bores of the sockets 2, and said bores or passageways are provided with longitudinal extensions 7 along their inner sides, said extensions cutting through the inner wall of the socket at the central portion of the bores or passageways and thus communicating with the same. The extensions 7, as shown in Figure 1 of the drawing, are V-shaped in cross section and the communicating opening 8 (see Figure 2) is elongated and arranged transversely of the bore of the socket.

A steel pin 9, generally round in cross section and of a diameter to snugly fit the bore or passageway 6 is adapted to be driven through the latter, and is of a length to have its ends lie flush with the sides of the web 5 when fully driven in. The pin 9 is provided with a longitudinal V-shaped rib 10 extending from end to end of the same, and the said rib is adapted to traverse the aforesaid extension 7 of the bore or passageway.

When the tubes 3 or 4 are properly placed into the sockets, the same extend slightly through the openings 8 and intersect the bores or passageways 6, and when the pin is driven into the latter, as shown in Figure 3, the hardened end of the pin will cut a shaving 11 from the side of the pipe and form a seat 12 therein of the exact shape of the rib 10, and thus rigidly secure the ends of the rails or posts in position within the coupling.

In all coupling sleeves, no matter of what shape or kind, each socket is provided with a bore or passageway for the locking pin, and in the event of the sleeve being heavier than that shown, the webs 5 may be dispensed with and the bore formed directly in the wall of the coupling in a manner to intersect the bore of the socket, as will be understood.

From the foregoing it will be seen that a simple, cheaply manufactured and efficient locking device has been provided for connecting rails or other tubular members to posts or the like, and that the same may be incorporated in the couplings without any material additional cost, the locking means, when properly and fully driven into position, being entirely concealed from view and presenting no projecting parts to cause injury to hands or clothing.

What is claim is:

A coupling for pipe railings comprising a socket adapted to receive a tubular rail, said socket having an integrally formed web at one side thereof, said web being provided with a transverse straight unyielding bore extending entirely through the same and having a V-shaped extension co-extensive therewith along the side next to the socket, said extension intersecting at its central portion the wall of the socket, and a straight pin co-extensive in length to, and of substantially the same diameter as the transverse bore, said pin having a longitudinal rib extending throughout its length and corresponding in cross-sectional shape to the V-shaped extension of the bore and adapted to snugly fit the same when the pin is driven into the bore from either direction, either end of the said rib serving as a V-shaped cutting tool where traversing the socket to form a kerf in the exterior wall of said rail and, by remaining therein, to lock said rail in the socket member, with the ends of the pin substantially flush with the sides of the web, said pin being capable of being withdrawn from either end.

In testimony, that I claim the foregoing as my own, I have hereto affixed my signature.

LOUIS G. HALLER.